M. P. DAVEN.
MACHINE FOR CUTTING AND SCORING BOX BLANKS.
APPLICATION FILED MAY 17, 1913. RENEWED DEC. 21, 1916.
1,235,293.
Patented July 31, 1917.
5 SHEETS—SHEET 2.
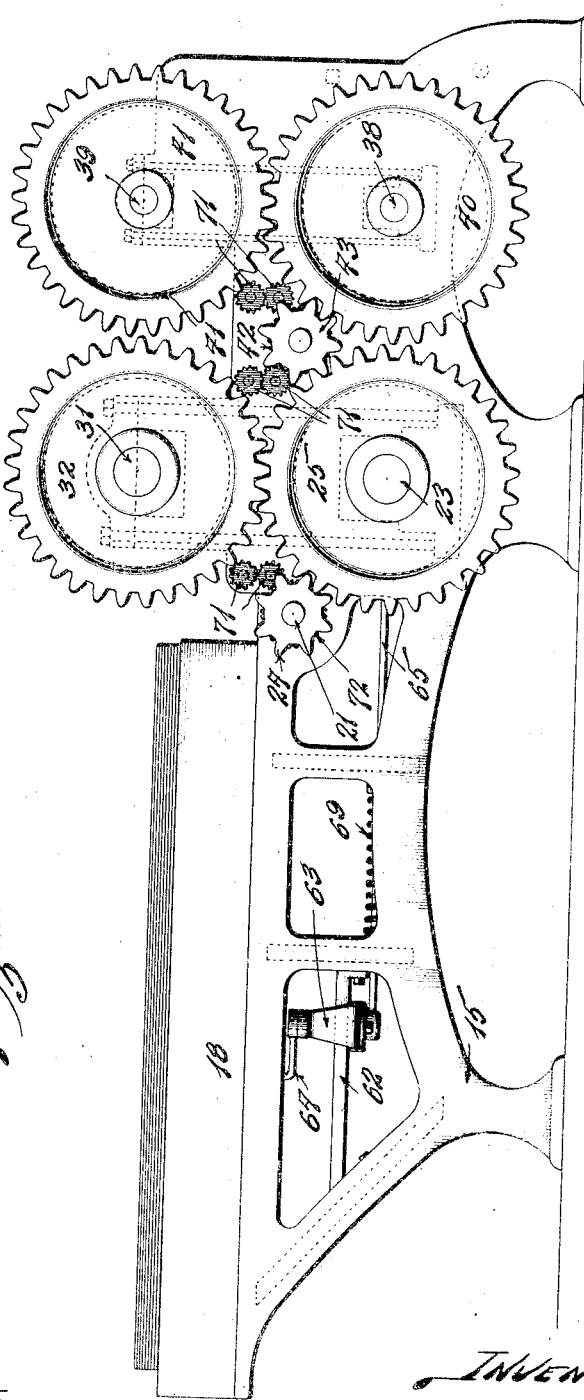

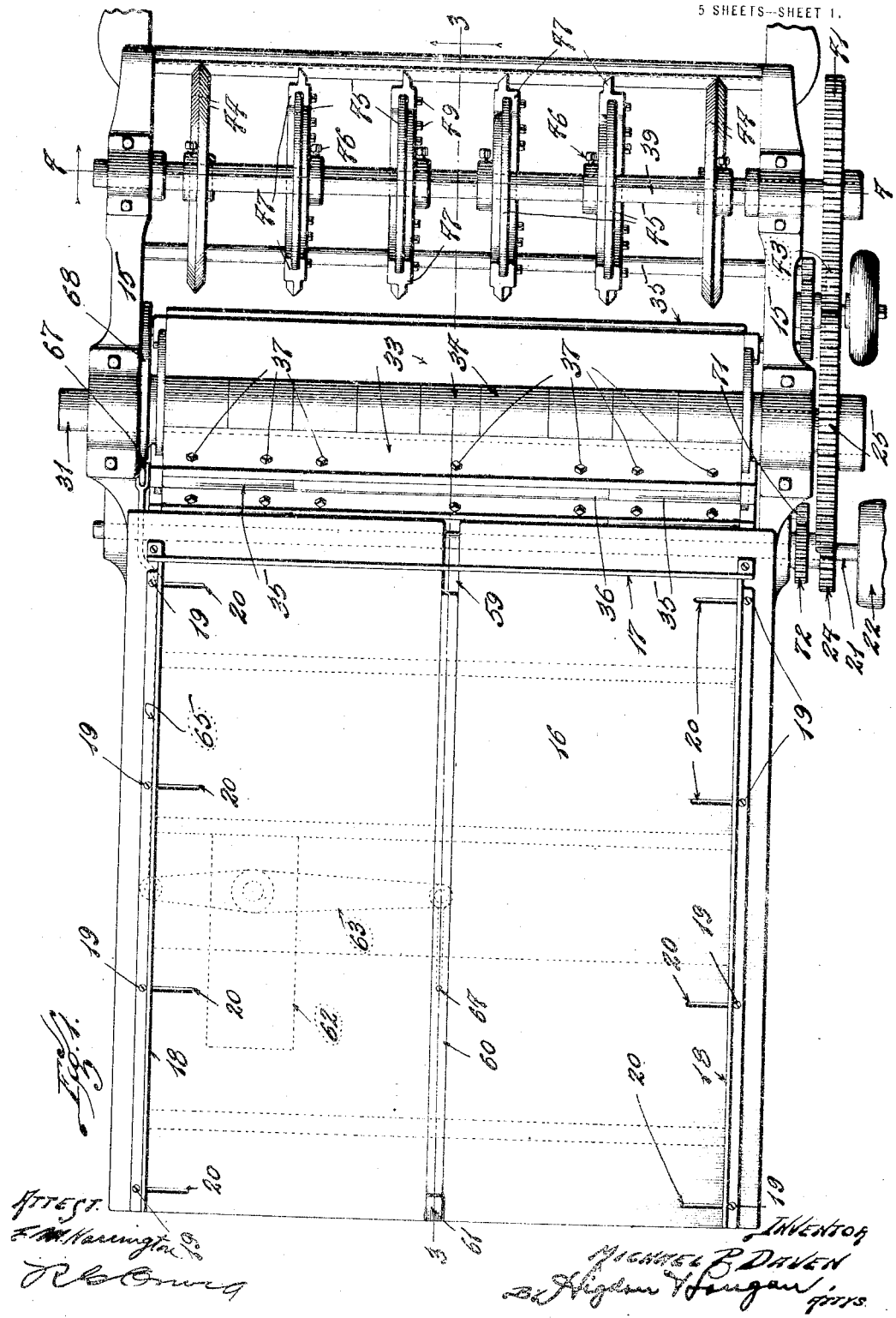

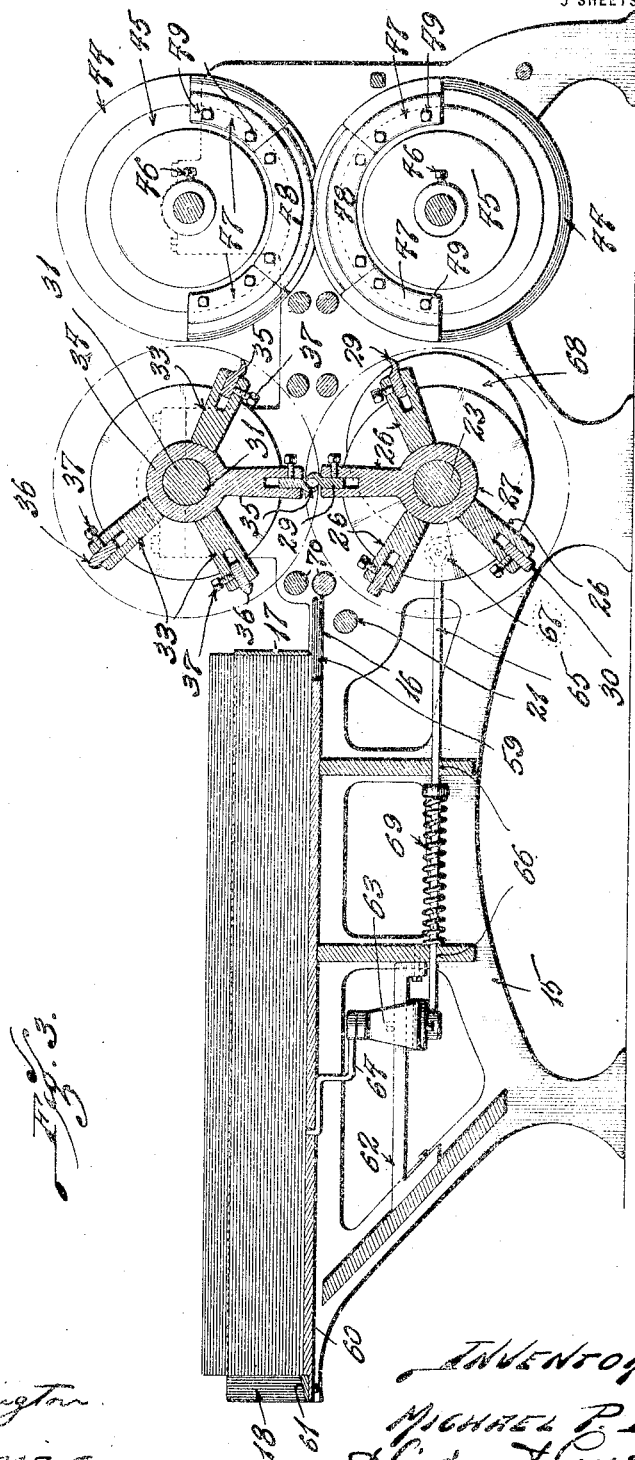

M. P. DAVEN.
MACHINE FOR CUTTING AND SCORING BOX BLANKS.
APPLICATION FILED MAY 17, 1913. RENEWED DEC. 21, 1916.
1,235,293.
Patented July 31, 1917.
5 SHEETS—SHEET 4.
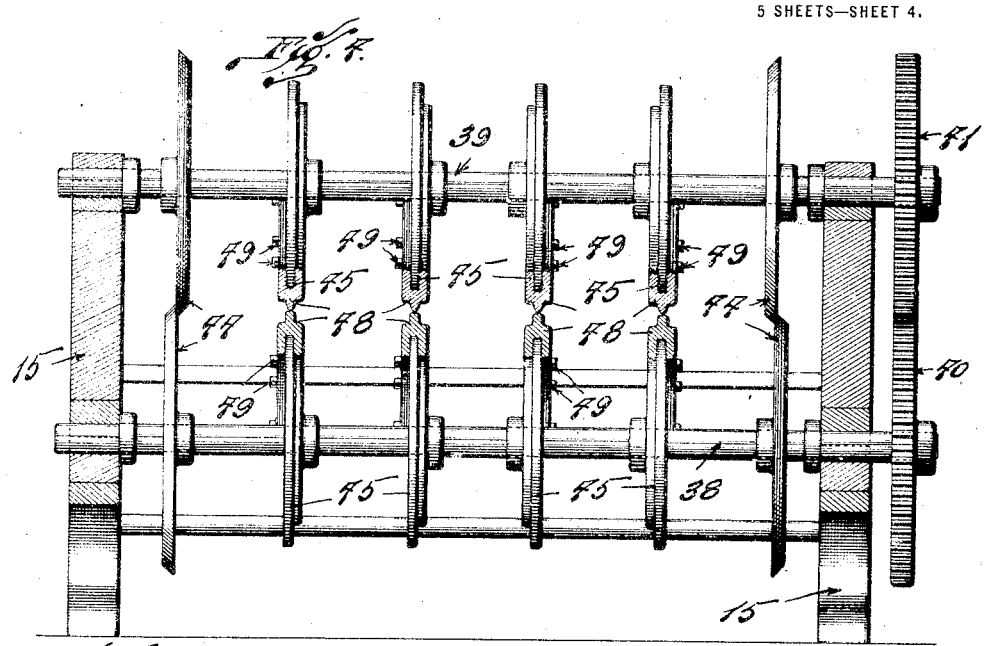
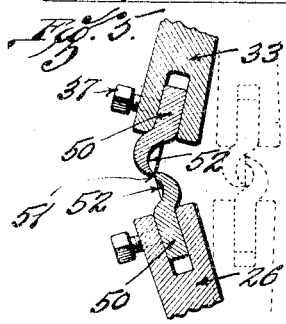
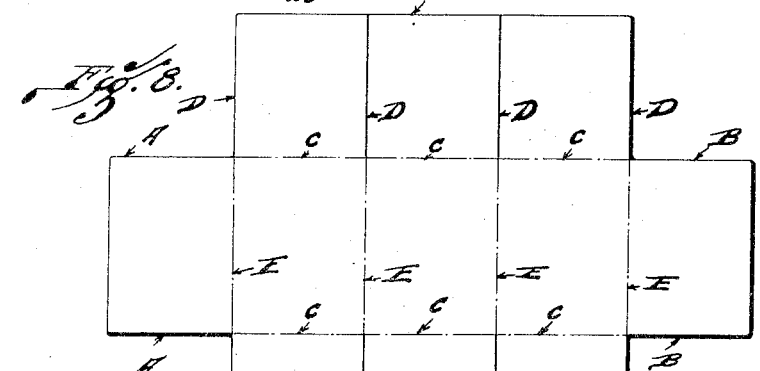

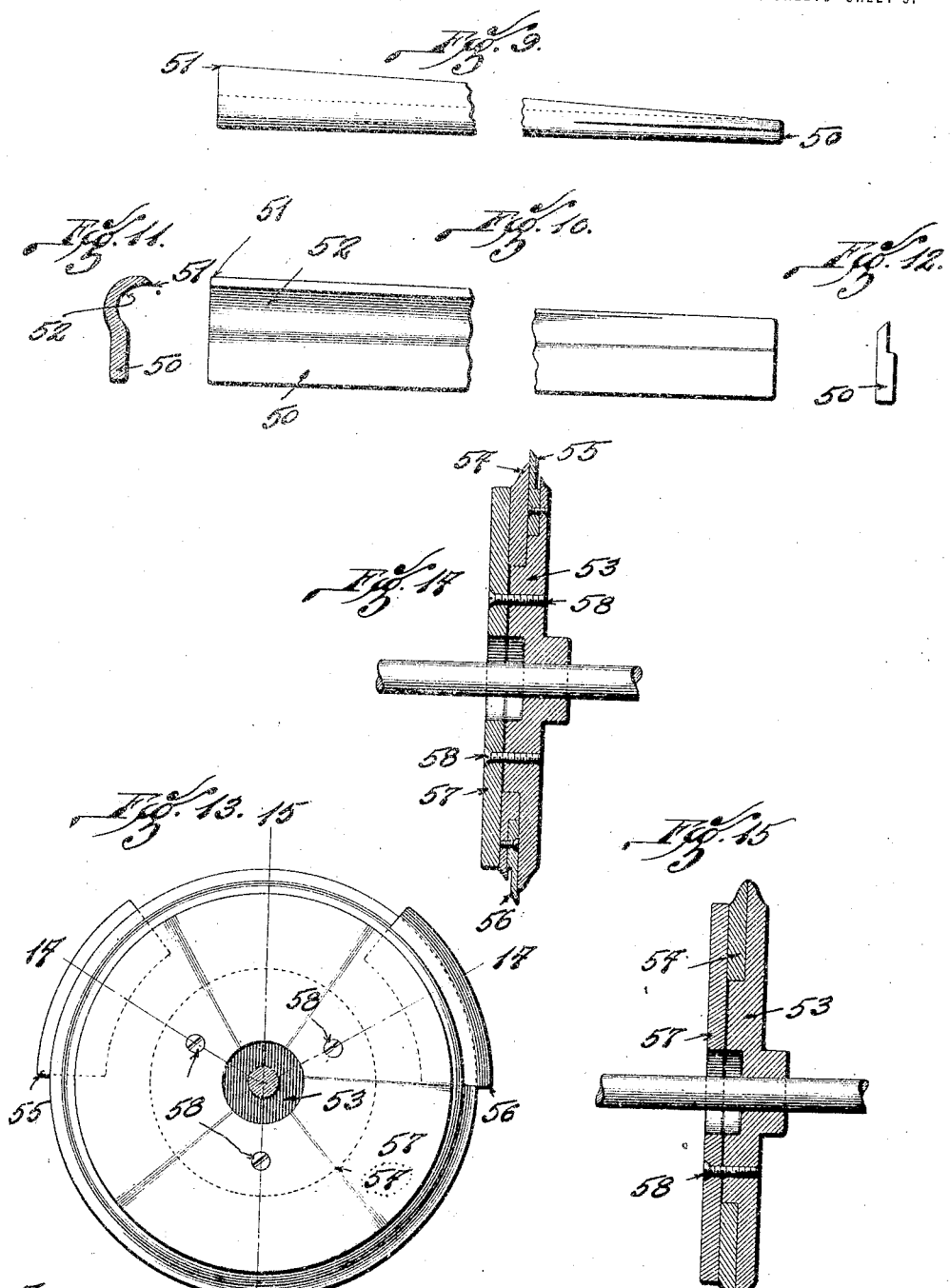

UNITED STATES PATENT OFFICE.

MICHAEL P. DAVEN, OF DALLAS, TEXAS, ASSIGNOR, BY DIRECT AND MESNE ASSIGNMENTS, OF ONE-FOURTH TO ALLMEN TRAXLER, ONE-FOURTH TO JACKSON J. OWEN, ONE-FOURTH TO JOSEPH P. CONNOR, AND ONE-FOURTH TO FREDERICK L. CORNWELL, ALL OF ST. LOUIS, MISSOURI.

MACHINE FOR CUTTING AND SCORING BOX-BLANKS.

1,235,293.      Specification of Letters Patent.    Patented July 31, 1917.

Original application filed August 29, 1912, Serial No. 717,717. Divided and this application filed May 17, 1913, Serial No. 768,342. Renewed December 21, 1916. Serial No. 138,283.

*To all whom it may concern:*

Be it known that I, MICHAEL P. DAVEN, a citizen of the United States, and resident of Dallas, Dallas county, Texas, have invented certain new and useful Improvements in Machines for Cutting and Scoring Box-Blanks, of which the following is a specification containing a full, clear, and exact description, reference being had to the accompanying drawings, forming a part hereof.

My invention relates to improvements in machines for cutting and scoring box blanks, and relates particularly to that class of machines for cutting and scoring box blanks in which rotating elements are employed for the various operations, and a machine which will in one cycle of operation perform either scoring or cutting operations at angles relative to each other.

The primary object of my invention is to construct a machine in which scoring, cutting and other devices necessary to form a complete blank are rotated to engage with a piece of material and arranged in such manner that a complete blank may be formed in each cycle of operation of the machine.

A further object of my invention is to construct a machine provided with rotating elements arranged to act upon the material in such manner that cutting, scoring and other like operations at angles relative to each other may be made in one cycle of operation.

A further object of my invention is to construct a single machine which will receive an irregular shaped piece of material and treat it in such manner that a blank may be made from which a box may be formed.

A still further object of my invention is to construct a single machine provided with rotating elements which will first cut, score or otherwise treat the material in one direction, then cut, score or treat the material in lines at an angle to the first cutting, scoring or treating.

A further and more specific object of my invention is to construct a machine in which the cutting, scoring and other devices may be detachably secured in place, in order that their lines of operation may vary as to length and character.

This is a divisional application from the one filed by me on August 29, 1912, serially numbered 717,717.

With the above purposes in view my invention consists in certain novel features of construction and arrangement of parts as will be hereinafter more fully described, pointed out in the claims and illustrated by the accompanying drawings, in which—

Figure 1 is a plan of the complete machine;

Fig. 2 is an elevation of the complete machine;

Fig. 3 is a longitudinal sectional elevation of the machine taken on the line 3—3 of Fig. 1;

Fig. 4 is a transverse sectional elevation taken on the line 4—4 of Fig. 1, and illustrates the longitudinal cutting devices;

Fig. 5 is a detail sectional elevation showing a pair of the transverse cutting tools in a position at the initial point of cutting, and in dotted lines illustrates the positions of the knives at the end of the cut;

Fig. 6 is a side elevation of one of the knives shown in Fig. 5, illustrating the end of the knife which terminates the operation of cutting, a fragment of one of the supporting disks being shown;

Fig. 7 is a face view, partly in section, illustrating the means for securing the knife or other tool-carrier to one of the disks which rotates with the driven shaft;

Fig. 8 shows in diagram a blank after it has been acted upon by the machine;

Fig. 9 is a plan of one of the transverse cutting knives;

Fig. 10 is a face view of the knife illustrated in Fig. 9;

Fig. 11 shows the initial cutting end of the knife;

Fig. 12 is the final cutting end of the knife;

Fig. 13 illustrates in elevation a modified form of a longitudinal cutting or scoring device;

Fig. 14 is a detail sectional elevation taken on the line 14—14 of Fig. 13; and

Fig. 15 is a view similar to Fig. 14 taken on the line 15—15 of Fig. 13.

Referring by numerals to the accompanying drawings:

15 designates the frame of the machine carrying at its one end a table 16 arranged to support a stack of pieces of material.

Fixed upon the upper face of the table 16, adjacent its right hand end is a vertical wall 17 secured at its ends, and between its ends spaced apart from the upper face of the table 16.

Secured to the table 16 adjacent its side margins are the vertical walls 18 which are laterally adjustable relative to the table by means of the set screws 19 and the slots 20 formed in the table.

The walls 17 and 18 form a hopper to receive and retain the pieces of material in proper feeding position.

Extended transversely of the machine and supported in the frame 15 is a driving shaft 21, preferably located beneath the right hand end of the table 16, and carried by the shaft 21 is a pulley 22 arranged to be connected with power.

The numeral 23 designates a shaft rotatably supported in the frame preferably to the right of and in a plane beneath the driving shaft 21.

The numeral 24 designates a pinion secured to rotate upon and with the shaft 21, and 25 designates a gear wheel secured upon the shaft 23 and in mesh with the pinion 24.

The numeral 26 designates a carrier having spaced apart collars 27 which are arranged to be secured upon and to rotate with the shaft 23.

In the drawings I illustrate four of such carriers, all mounted upon the same shaft and all of which are identical, except for the arrangement of the collars.

The outer margins of each of the carriers 26 are provided with recesses arranged to receive tools, such as a knife 29 or an anvil 30.

Rotatably mounted in the frame 15, immediately above the shaft 23, is a shaft 31 and carried thereby is a gear wheel 32 arranged to mesh with the gear wheel 25.

Supported upon the shaft 31 is a plurality of carriers 33, each having spaced apart collars 34 arranged to embrace the shaft 31. These carriers and collars are identically like the carriers and collars 26 and 27 supported on the shaft 23.

Secured in a pair of the carriers 33 are knives 35 which are identically like the knives 29 carried by the shaft 23, and in the remaining carriers 33 there are scoring tools 36.

The knives 35 are arranged to cooperate with the knives 29, and the scoring tools 36 are arranged to cooperate with the anvils 30.

In order that each of the tools, whether it be a knife or scoring tool, may be detachably secured in the carriers, I have provided set screws 37.

Rotatably mounted in the frame 15, to the right of the shafts 23 and 31, is a pair of shafts 38 and 39 arranged one above the other, and each of which occupies about the same horizontal plane as the shafts 23 and 31.

Secured to rotate upon the shafts 38 and 39 are the gear wheels 40 and 41 which intermesh.

Arranged between the shafts 23, 31, 38 and 39 is a stub-shaft 42 arranged to support a pinion 43, which intermeshes with the gear wheel 25 and also with the gear wheel 40 in order that the shafts 23 and 38 are rotated in one direction, and the shafts 31 and 39 rotated in the opposite direction from the shafts 23 and 38.

Supported by the shafts 38 and 39, adjacent their ends within the machine frame, are the resizing disks 44.

These resizing disks are adjustable lengthwise of their shafts by means of set screws, in order to properly size the finished piece of material.

Mounted upon the shafts 38 and 39, between the resizing disks, are the disks 45 adjustably secured to the shafts by means of set screws 46, and carried by each of the disks 45 are the segmental tools, such as longitudinal cutting tools 47 and the longitudinal scoring tools 48.

The innermost margins of the tools are recessed, and the recessed portions carry set screws 49, in order that the tools may be readily detached from the disk and in order that the tools may be adjustable arcually of the disks.

The longitudinal cutting tools 47, in order to produce a shearing cut, must necessarily overlap the cutting tool carried by a complementary disk, while the scoring tools and anvils are on complementary disks spaced apart according to the thickness of material and depth of score desired.

Each tool-carrier, whether it be a transverse tool-carrier or a longitudinal tool-carrier, is arranged to receive both a cutting tool and a scoring tool.

One of the transverse tool-carriers is equipped with tools in order to form the transverse cuts A and B and the transverse scores C, while the longitudinal tool-carriers are equipped with tools in order to form the longitudinal cuts D and the longitudinal scores E.

One of the pairs of transverse cutting tools is continuous for the width of the piece of material, in order to form the resizing transverse cuts F.

Each of the transverse cutting tools comprises a substantially straight, rectangular body portion 50 arranged to be seated in the recess of a carrier.

At one end of the tool, the cutting edge 51 is in advance of the body portion, and at the opposite end the cutting edge is in the plane of the body of the tool.

In order that there be clearness between the complementary knives, there is a longitudinal tapering channel 52. These channels have greatest depth at the initial cutting ends of the knives and vanish to zero at the final cutting ends of the knives.

For the reason that the cutting edge at one end of the knife is in advance of the cutting edge at the other end of the knife, regardless of its length, the transverse cutting will progress laterally synchronously with the longitudinal progression of the material, in order that a true transverse shear is performed.

In Figs. 13, 14 and 15 there is illustrated a longitudinal cutting and scoring device which comprises a disk 53 secured to rotate with one of the shafts 38 and 39. One face of the disk 53 is annularly recessed to receive a ring 54, the peripheries of the ring and disk forming companion scoring flanges.

Leading from the recess which receives the ring is a segmental recess arranged to receive a cutting tool 55, and formed in the ring is a segmental recess arranged to receive a cutting tool 56.

The body of the ring 54 has greater thickness than the recess in which it is seated, in order that its outer face will project beyond the plane of the body of the disk.

The numeral 57 designates a clamping plate attached to the disk by screws 58, in order to hold the ring 54 against arcual movement relative to the disk.

If, for any reason, it be desired to vary the lead of the knife secured to the disk, the disk may be rotated relative to its supporting shaft and if it be desired to vary the arcual separation of the knives 55 and 56, the plate 57 is loosened to permit of the ring 54 being rotated relative to the disk.

By reason of the continuous companion scoring flanges, the operation of scoring may be accomplished with a varying arcual separation of the cutting tools.

In order that the pieces of material be selected one at a time from the stack, I have provided the feeding mechanism as follows:

Formed in the table 16 there is a slot 59 which extends lengthwise of the table and is located preferably upon a longitudinal median line.

Arranged for reciprocation within the slot 59 there is a feed-bar 60, and carried by the feed-bar there is a follower 61 arranged to be adjustable lengthwise relative to the bar.

Carried by the frame 15, beneath the table 16, there is a support 62, and pivotally carried by said support is a rocking lever 63, having its one end connected with the feed-bar 60 by means of a link 64.

The numeral 65 designates a plunger arranged to slide in bearings 66 carried by the machine frame.

One end of the plunger is pivotally connected with the arm of the lever 63 opposed to the arm connected with the feed-bar, while the other end of the plunger carries a roller 67 (shown only by dotted lines in Fig. 3).

Carried by the shaft 23 is a cam 68 arranged to engage with the roller 67 for the reciprocation of the plunger 65 and the reciprocation or movement of the feed-bar.

The numeral 69 designates a spring arranged for the operation of the plunger 65 in a direction opposed to the operation effected by the cam 68.

For the reason that the feed-bar obtains its movement from the shaft upon which the transverse scoring devices are carried, the timing of the feeding is necessarily in relation to the scoring and cutting operations Arranged in the path of travel of the pieces of material is a series of feed-rollers 70, which receive the pieces of material from the table 16 after they have been moved by the feed-bar 60.

Each of the rollers 70 carries a pinion 71, each pair of which intermesh with each other, and one of each pair arranged to mesh with a gear wheel 72 which is operated in unison with one of the pinions 24 or 43.

In the practical operation of the machine, assuming the parts to be assembled as shown and a plurality of pieces of material stacked in the hopper, and further assuming power to be applied to the pulley 22, the initial operation is the rotation of the cam 68 which will move the plunger 65 in a direction to move the feed-bar toward the cutting and scoring tools. Simultaneously with the movement of the cam, the first pair of feed-rollers 70 will engage with the piece of material and continue its movement toward the cutting and scoring tools.

During the movement of the piece of material, the first set of transverse resizing tools engages the piece of material and shears it, the tools shown making a true right angle cut relative to the trend of travel of the piece of material. (The cut just referred to is the cut F in the diagram shown in Fig. 8.)

As the piece of material is further moved, the first set of transverse scoring tools 36 engages with the material and indents or impresses therein score lines extending parallel with the initial resizing cut. (These score lines are indicated by C in the diagram shown in Fig. 8.)

The tool-carrier which carries the initial transverse scoring tools also carries cutting knives which are in all particulars the same as the resizing knives, except for length, and at the same time the scoring tools are performing the initial transverse scores C the transverse cutting knives perform the cuts A and B. (These cuts A and B are shown in the diagram in Fig. 8.)

Immediately preceding the initial scoring and transverse cutting, the forward margin of the piece of material has been engaged by a second pair of feed-rolls for its further advancement and in order that the piece of material may be held smooth at the points of operation.

The piece of material is then operated upon by the second set of transverse scoring and cutting tools, whose construction and arrangement is identically like the construction and arrangement of the transverse scoring and cutting tools just described. These scoring and cutting tools perform the operations of the second transverse scores C and the second transverse cuts A and B.

The piece of material, in its advancement, is then engaged by a third set of feed-rolls which guides the piece of material to be acted upon by the longitudinal cutting tools 47, in order to perform the initial longitudinal cuts D.

Simultaneously with this longitudinal cutting, the longitudinal resizing tools 44 operate to perform the longitudinal marginal resizing.

As the piece of material is advanced further, the terminal resizing is accomplished, the marginal resizing being continued for the length of the piece, and the second set of longitudinal cutting devices performs the second or terminal longitudinal cuts D.

During the interim between the initial longitudinal cut D and the terminal longitudinal cut D, the companion scoring flanges perform the operation of making the longitudinal scores E.

In view of the fact that motion is applied to a shaft which is geared to both feeding and scoring and cutting devices, it is obvious that their operations are accurately timed relative to each other, so that, when the machine is once adjusted to a given size of blank, the resizing, scoring and cutting is identical in all blanks supplied to the machine.

In arranging the parts, as shown and described, a single machine accomplishes the act of forming a complete blank from which a box may be folded.

In view of the fact that all of the cutting and scoring tools are adjustable in two directions, the same machine is adapted to form blanks of various sizes and character.

In view of the fact that all of the operating devices may be arcually adjusted relative to each other, the timing of any one device may be altered at will relative to the travel of the piece of material acted upon.

I claim:

1. In a machine of the class described, a pair of companion knives revoluble upon an axis at right angles to the machine, the cutting edge of each knife arranged non parallel with said axis, there being a recess in the body of each knife contiguous to the cutting edge, in order to provide a clearance for the companion knife.

2. In a machine of the class described, a driven shaft, a disk axially adjustably secured to the shaft, there being an annular recess in the side of the disk, a ring seated in said recess, the peripheral margins of said disk and ring forming companion scoring flanges, there being a recess in said ring, a cutting tool detachably secured in the recess of said ring with its outer edge projecting beyond the scoring flanges, and a clamping plate detachably secured to the disk over said ring.

In testimony whereof, I have signed my name to this specification, in presence of two subscribing witnesses.

MICHAEL P. DAVEN.

Witnesses:
J. Ross Johnson,
C. W. Robinson.